United States Patent
Yoshihiro et al.

(10) Patent No.: US 9,512,833 B2
(45) Date of Patent: Dec. 6, 2016

(54) CONTROL VALVE FOR VARIABLE DISPLACEMENT COMPRESSOR

(71) Applicant: TGK CO., LTD., Tokyo (JP)

(72) Inventors: Ryousuke Yoshihiro, Tokyo (JP); Morimitsu Kajiwara, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 14/709,447

(22) Filed: May 11, 2015

(65) Prior Publication Data

US 2015/0260176 A1    Sep. 17, 2015

Related U.S. Application Data

(62) Division of application No. 14/624,966, filed on Feb. 18, 2015.

(30) Foreign Application Priority Data

Feb. 27, 2014    (JP) ................................ 2014-036184

(51) Int. Cl.
  *F04B 27/18*    (2006.01)
  *F25B 49/02*    (2006.01)
  (Continued)

(52) U.S. Cl.
  CPC ....... *F04B 27/1804* (2013.01); *F04B 27/1036* (2013.01); *F16K 31/0686* (2013.01);
  (Continued)

(58) Field of Classification Search
  CPC .............. F04B 27/1036; F04B 27/1804; F04B 27/1886; F04B 27/189; F04B 2027/1809; F04B 2027/1813; F04B 2027/1822; F04B 2027/1829; F04B 2027/1831; F04B 2027/1836; F04B 2027/184; F04B 2027/185; F04B 2027/1859; F04B 2027/1886; F25B 41/04; F25B 31/002; F25B 2600/2515; F25B 49/022; F25B 2600/023; F25B 2600/027; F16K 31/0686

See application file for complete search history.

(56) References Cited

U.S. PATENT DOCUMENTS 5,318,410 A  *  6/1994  Kawamura  ......... F04B 27/1804
                                                  417/222.2
6,179,572 B1 *  1/2001  Taguchi  .............. F04B 27/1804
                                                  417/222.2
(Continued)

FOREIGN PATENT DOCUMENTS

EP    1561948 A2    8/2005    .............. F04B 27/18
EP    1628017 A2    2/2006    .............. F04B 27/18
(Continued)

OTHER PUBLICATIONS

EP15175003.1, European Search Report, Jul. 12, 2015, Munich.

*Primary Examiner* — Charles Freay
*Assistant Examiner* — Joseph Herrmann
(74) *Attorney, Agent, or Firm* — Martine Penilla Group, LLP

(57) ABSTRACT

A control valve according to one embodiment includes a shaft that transmits the solenoidal force to a valve element. The control valve also provides for stable operation of a variable displacement compressor even under high-temperature and high-pressure environments. A solenoid includes a bottomed sleeve into which the pressure of refrigerant is introduced, a core secured coaxially to the sleeve, a plunger, contained in the sleeve on its bottom side, which is displaceable integrally with the shaft in a direction of axis line, a first spring that applies the biasing force in a valve opening direction to the shaft, a second spring that applies the biasing force in a valve closing direction to the plunger, and a shaft (Continued)

support member, which is press-fitted such that the shaft support member is secured to an inner wall of the sleeve near its bottom portion. The second spring is set between the shaft support member and the plunger.

16 Claims, 6 Drawing Sheets

(51) Int. Cl.
    *F04B 27/10*     (2006.01)
    *F16K 31/06*     (2006.01)

(52) U.S. Cl.
    CPC ...... *F25B 49/022* (2013.01); *F04B 2027/185* (2013.01); *F04B 2027/189* (2013.01); *F04B 2027/1813* (2013.01); *F04B 2027/1822* (2013.01); *F04B 2027/1827* (2013.01); *F04B 2027/1831* (2013.01); *F04B 2027/1859* (2013.01); *F25B 2600/023* (2013.01); *F25B 2600/027* (2013.01)

(56) References Cited

U.S. PATENT DOCUMENTS

| | | | | |
|---|---|---|---|---|
| 7,014,428 B2* | 3/2006 | Pitla | ..................... | F04B 27/1804 184/26 |
| 7,437,881 B2* | 10/2008 | Hirota | ................. | F04B 27/1036 251/129.01 |
| 2004/0074245 A1* | 4/2004 | Nakazawa | ............ | F04B 27/109 62/196.1 |
| 2008/0185545 A1* | 8/2008 | Hirota | ................ | B60H 1/00485 251/129.15 |

FOREIGN PATENT DOCUMENTS

| | | | | |
|---|---|---|---|---|
| EP | 1681466 A2 | 7/2006 | .............. | F04B 27/10 |
| JP | 2011032916 A | 2/2011 | .............. | F04B 27/14 |
| JP | 2011043102 A | 3/2011 | .............. | F04B 27/14 |

* cited by examiner

CONTROL VALVE FOR VARIABLE DISPLACEMENT COMPRESSOR

CLAIM OF PRIORITY

This application is a Divisional of U.S. patent application Ser. No. 14/624,966, filed on Feb. 18, 2015, and entitled, "Control Valve for Variable Displacement Compressor", which further claims priority to Japanese Patent Application No. 2014-036184, filed Feb. 27, 2014, and are incorporated herein by reference.

BACKGROUND OF THE INVENTION

1. Field of the Invention

The present invention relates to a control valve for controlling the discharging capacity of a variable displacement compressor.

2. Description of the Related Art

An automotive air conditioner is generally configured by arranging and placing a compressor, a condenser, an expander, an evaporator, and so forth in a refrigeration cycle. The compressor is, for example, a variable displacement compressor (hereinafter referred to simply as "compressor" also) capable of varying the refrigerant discharging capacity in order to maintain a constant level of cooling capacity irrespective of the engine speed. In this compressor, a piston for compression is linked to a wobble plate, which is mounted to a rotational shaft rotatingly driven by an engine. And the refrigerant discharging rate is regulated by changing the stroke of the piston through changes in the angle of the wobble plate. The angle of the wobble plate is changed continuously by changing the balance of pressure working on both faces of the piston as part of the discharged refrigerant is introduced into a hermetically-closed crankcase. The pressure within this crankcase (hereinafter referred to as "crank pressure") Pc is controlled by a control valve for a variable displacement compressor (hereinafter referred to simply as "control valve" also), which is provided between the discharge chamber and the crankcase of the compressor.

Such a control valve is often configured as an electromagnetic valve and has a valve hole, through which to communicate between the discharge chamber and the crankcase, within a body. And the opening degree of a valve section is regulated by moving a valve element, placed within the body, toward and away from the valve hole, thereby controlling the flow rate of refrigerant introduced into the crankcase. The valve opening degree is regulated by a balance among a force, generated by a refrigerant pressure, acting on the valve element, a drive force generated by a solenoid, and a biasing force of a spring placed for the purpose of regulating a control setting value.

RELATED ART LIST (1) Japanese Unexamined Patent Application Publication No. 2005-214059.

In recent years, spurred by the global warming issue, it is being proposed that alternative chlorofluorocarbon (CFC), which is conventionally used as the refrigerant used in the refrigeration cycle be replaced by carbon dioxide and the like. However, in the refrigeration cycle where, for example, carbon dioxide is used, the pressure of refrigerant is increased to a supercritical range exceeding the critical temperature thereof and therefore the discharge pressure of refrigerant gets very high. As a result, required is a control valve where a stable operation of the compressor can be ensured even under such high-temperature and high-pressure environments.

SUMMARY OF THE INVENTION

A purpose of the present invention is to provide a control valve for ensuring a stable operation of a variable displacement compressor even under high-temperature and high-pressure environments.

One embodiment of the preset invention relates to a control valve for a variable displacement compressor that varies a discharging capacity of the compressor for compressing refrigerant led into a suction chamber and discharges the compressed refrigerant from a discharge chamber, by regulating a flow rate of the refrigerant led into a crankcase from the discharge chamber. The control valve includes: a body having a discharge chamber communication port communicating with the discharge chamber, a crankcase communication port communicating with the crankcase, a valve hole formed in a passage connecting the discharge chamber communication port and the crankcase communication port, and a valve chamber formed between the valve hole and the crankcase communication port; a valve element for opening and closing a valve section by moving toward and away from the valve hole, the valve element being arranged in the valve chamber; a solenoid, provided on the body, which generates a solenoidal force with which to drive the valve element in a valve closing direction in accordance with an amount of current supplied thereto; and a bleed hole that enables the refrigerant to be leaked from the discharge chamber communication port to the valve chamber while the valve section is being closed, the bleed hole having a leak passage, whose diameter is smaller than that of the valve hole, and the bleed hole being provided radially outward of the valve hole in the body.

A raised portion, which is of a stepped shape, is provided on an end surface of the body at a discharge chamber communication port side, and the leak passage is open on the discharge chamber communication port side in the raised portion.

By employing this embodiment, a minimum required refrigerant can be delivered through the bleed hole even while the valve section is being closed, so that the circulation of oil in the compressor can be ensured. In particular, the diameter of the leak passage, which forms an inlet of the bleed hole, is made small, and the inlet thereof is opened on an upper surface of the stepped shape thereof; this can prevent or suppress a foreign material from entering into the bleed hole. If the foreign material should enter the discharge chamber communication port and hit the raised portion, it is highly probable the foreign material will fall off of the raised portion and will therefore be less likely to enter the leak passage. Hence, the circulation of oil can be ensured. As a result, the stable operation of the variable displacement compressor can be ensured even under high-temperature and high-pressure environments.

DETAILED DESCRIPTION OF THE INVENTION

The invention will now be described by reference to the preferred embodiments. This does not intend to limit the scope of the present invention, but to exemplify the invention.

Embodiments of the present invention will now be described in detail with reference to the accompanying drawings. In the following description, for convenience of description, the positional relationship in each structure may be expressed as "vertical" or "up-down" with reference to how each structure is depicted in Figures.

Figure 1:
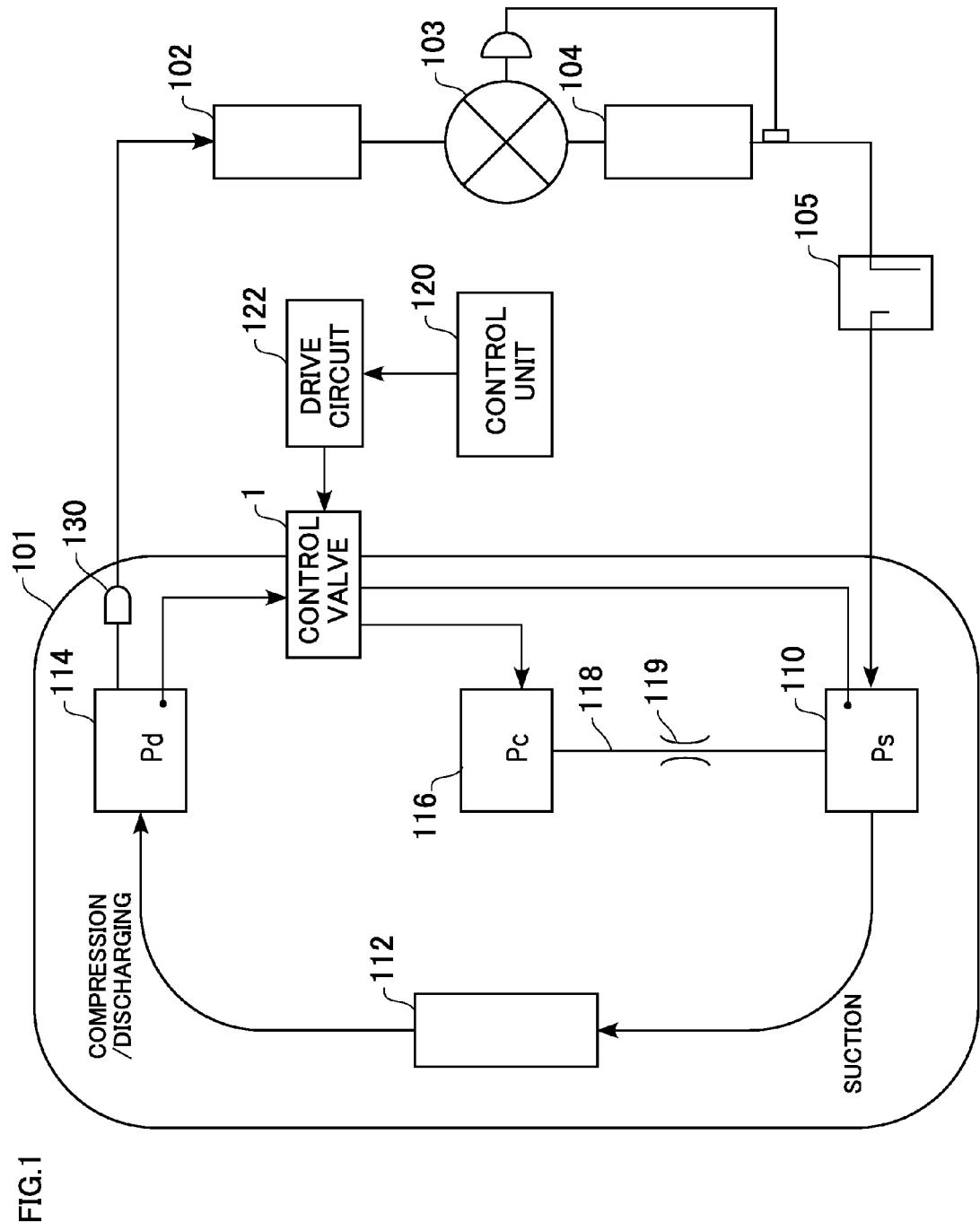
FIG. 1 is a system chart showing a refrigeration cycle of an automotive air conditioner according to an embodiment.

FIG. 1 is a system chart showing a refrigeration cycle of an automotive air conditioner according to an embodiment. The air conditioner according to the present embodiment includes a so-called supercritical refrigeration cycle that uses carbon dioxide, which operates under a high pressure, as the refrigerant. This air conditioner includes a variable displacement compressor (hereinafter referred to simply as "compressor" also) 101, a gas cooler 102, an expander 103, an evaporator 104, and a receiver 105. Here, the compressor 101 compresses a gaseous refrigerant circulating through the refrigeration cycle. The gas cooler 102 functions as an external heat exchanger that cools a compressed high-pressure gaseous refrigerant. The expander 103 adiabatically expands the cooled refrigerant so as to reduce the pressure thereof. The evaporator 104 evaporates the expanded refrigerant and removes the evaporative latent heat so as to cool air inside a vehicle's compartment. The receiver 105 separates the evaporated refrigerant into gas refrigerant and liquid refrigerant and then returns the thus separated gaseous carbon dioxide to the compressor 101.

The compressor 101 has a not-shown rotational shaft, which is freely rotatably supported within crankcase 116. A wobble plate is tiltably provided in this rotational shaft. And an end of the rotational shaft extends outside the crankcase 116 and is connected to an output shaft of an engine by way of a pulley. A plurality of cylinders 112 are arranged around the rotational shaft, and a piston, which performs a reciprocating motion by the rotational motion of the wobble plate, is provided in each cylinder 112. Each cylinder 112 is connected to a suction chamber 110 through a suction valve and is connected to a discharge chamber 114 through a discharge valve. The compressor 101 compresses the refrigerant, which has been led into the cylinders 112 through the suction chamber 110, and discharges the compressed refrigerant through the discharge chamber 114.

The angle of the wobble plate of the compressor 101 is kept in a position where, for example, the load of a spring biasing the wobble plate in the crankcase 116 and the load caused by the pressures working on both faces of the piston connected to the wobble plate are balanced. This angle of the wobble plate can be changed continuously as follows. That is, a crank pressure Pc is changed as part of the discharged refrigerant is introduced into the crankcase 116, and the balance of pressures working on the both faces of the piston is changed, thereby changing continuously the angle thereof. Changing the stroke of the piston by varying the angle of the wobble plate regulates the discharging capacity of refrigerant. The crank pressure Pc is controlled by a control valve 1, which is provided between the discharge chamber 114 and the crankcase 116 of the compressor 101.

In other words, a part of the discharged refrigerant of the compressor 101 is led into the crankcase 116 by way of the control valve 1 and is used to control the capacity of the compressor 101. The control valve 1 is configured as a solenoid-driven electromagnetic valve, and the electric conduction state and/or amount is controlled by a control unit 120. In the present embodiment, the control unit 120 outputs a pulse signal, which has been set to a predetermined duty ratio, to a drive circuit 122. Then the control unit 120 has the drive circuit 122 output a current pulse associated with the duty ratio. In this manner, the solenoid is driven. The control valve 1 regulates the flow rate of refrigerant delivered from the discharge chamber 114 to the crankcase 116 such that a differential pressure (Pd-Ps) between a discharge pressure Pd and a suction pressure Ps of the compressor 101 can be brought closer to a preset differential pressure, which is a control target value. Thereby, the discharging capacity of the compressor 101 varies. That is, the control valve 1 functions as a so-called (Pd-Ps) differential pressure regulating valve.

An orifice 119 is provided in a refrigerant passage 118 through which the crankcase 116 and the suction chamber 110 communicate. The refrigerant inside the crankcase 116 is leaked to a suction chamber 110 side through the orifice 119, so that the crank pressure Pc will not be excessively high. A check valve 130 is provided in a refrigerant passage provided between the discharge chamber 114 and a refrigerant outlet in the compressor 101.

The control unit 120 includes a CPU for performing various arithmetic processing's, a ROM for storing various control programs, a RAM used as a work area for data storage and program execution, an I/O interface, and so forth. The control unit 120 has a PWM output unit for outputting a pulse signal having a specified duty ratio. However, such a PWM output unit may be configured using a known art and therefore the detailed description thereof is omitted here. The control unit 120 determines the aforementioned preset differential pressure, based on predetermined external information detected by various sensors (e.g., the engine speed, the temperatures inside and outside the passenger compartment, and the air-blowout temperature of the evaporator 104). Also, the control unit 120 controls the electric conduction state of and/or amount to the control valve 1 in order to obtain a solenoidal force required to maintain the preset differential pressure. Suppose now that there is a request for cutting down on the acceleration for the purpose of reducing the load torque of the compressor 101 during a high load state (e.g., while a vehicle is accelerating or running uphill). Then, the control unit 120 turns off the solenoid or suppresses the electric conduction amount to a predetermined lower limit, and thereby switches the variable displacement compressor to an operation mode where the compressor operates with the minimum capacity.

The expander 103, which is configured as a so-called thermostatic-expansion valve, regulates a valve opening degree by feeding back the temperature of refrigerant at an outlet side of the evaporator 104 and then supplies a liquid refrigerant, which meets a thermal load, to the evaporator 104. The refrigerant, which has passed through the evaporator 104, is returned to the compressor 101 via the receiver 105 and is again compressed.

The check valve 130 maintains its opened state as long as the discharging capacity of the compressor 101 is large to a certain degree and a differential pressure (Pd-Pd1) between the discharge pressure Pd of the discharge chamber 114 and an outlet pressure Pd1 at the refrigerant outlet exceeds a valve opening differential pressure. This valve opening differential pressure is set by the load of a built-in spring of the check valve 130. If, in contrast thereto, the discharging capacity of the compressor 101 is small and the discharge pressure Pd does not sufficiently get high (e.g., during a minimum capacity operation), the check valve 130 will be closed due to the biasing force of the spring and thereby the back-flow of refrigerant from a gas cooler 102 side to the discharge chamber 114 will be prevented. Note that the check valve 130 is closed while the compressor 101 is operating with the minimum capacity. However, the refrigerant discharged from the discharge chamber 114 is returned to the suction chamber 110 via the control valve 1 and the crankcase 116. Thus, the internal circulation of refrigerant gas within the compressor 101 is assured.

Figure 2:
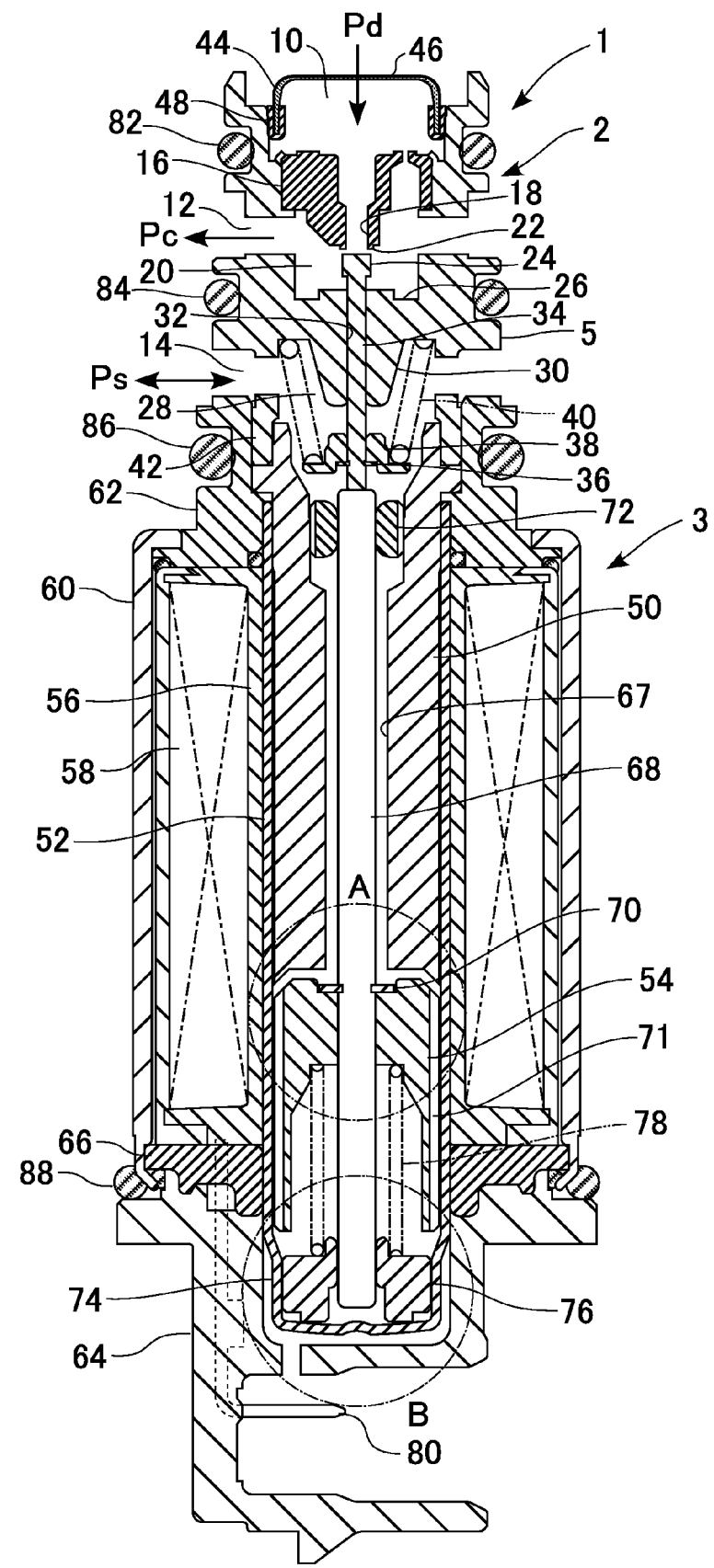
FIG. 2 is a cross-sectional view showing a structure of a control valve according to an embodiment.

FIG. 2 is a cross-sectional view showing a structure of the control valve 1 according to an embodiment. The control valve 1 is constituted by integrally assembling a valve unit 2 and a solenoid 3. The valve unit 2 has a body 5 of stepped cylindrical shape. Though the body 5 is formed of brass in the present embodiment, it may be formed of an aluminum alloy. The body 5 has ports 10, 12, and 14 in this order from top down. Of these ports, the port 10 is provided in an upper end of the body 5, and the ports 12 and 14 are each provided on a lateral side thereof. The port 10 functions as a "discharge chamber communication port" that communicates with the discharge chamber 114. The port 12 functions as a "crankcase communication port" that communicates with the crankcase 116. The port 14 functions as a "suction chamber communication port" that communicates with the suction chamber 110.

In the body 5, a valve seat forming member 16 of stepped cylindrical shape is provided in a passage that communicates between the port 10 and the port 12. The valve seat forming member 16 is formed by quenching a stainless steel (e.g., SUS420), and the hardness thereof is higher than that of the body 5. The valve seat forming member 16 is coaxially inserted to an upper portion of the body 5 and is secured such that the upper portion of the body 5 is swaged inward. The valve seat forming member 16 has a through-hole along an axis line, and a lower half of the through-hole forms a valve hole 18. A valve chamber 20, which communicates with the port 12, is formed below the valve seat forming member 16. The lower half of the valve seat forming member 16 is of tapered shape such that the outside diameter thereof is gradually reduced from an upper part to a lower part of the lower half thereof, and the lower half thereof extends into the valve chamber 20. A valve seat 22 is formed on a lower end surface of the valve seat forming member 16. A valve element 24 is provided in the valve chamber 20 in such a manner as to face the valve seat 22 from below. The opening degree of a valve section is regulated by moving the valve element 24 toward and away from the valve seat 22.

A partition wall 26 is so provided that an internal space of the body 5 is divided into an upper space and a lower space. The valve chamber 20 is formed on an upper side of the partition wall 26, and a working chamber 28 is formed on a lower side thereof. The valve chamber 20 communicates with the crankcase 116 through the port 12. The working chamber 28 communicates with the suction chamber 110 through the port 14. A guide portion 30, which extends in a direction of axis line, is provided in a center of the partition wall 26. A guiding passage 32 is so formed as to run through the guide portion 30 along the axis line, and an elongated actuating rod 34 is slidably inserted to the guiding passage 32 in the direction of axis line. The valve element 24 is provided coaxially on an upper end of the actuating rod 34. The valve element 24 and the actuating rod 34 are formed integrally with each other by performing a cutting work on a stainless steel.

The guide portion 30 protrudes as a small bump on an upper surface side of the partition wall 26 and protrudes as a large protrusion on a lower surface side thereof. The guide portion 30 is of tapered shape such that the outside diameter thereof is gradually reduced from an upper part to a lower part thereof, and the guide portion 30 extends into the working chamber 28. With this configuration and arrangement, a sufficient length of the guiding passage 32 is ensured and the actuating rod 34 is stably supported. The valve element 24 and the actuating rod 34 operate and move integrally together with each other, and the valve element 24 closes and opens the valve section by touching and leaving the valve seat 22, respectively, on the upper end surface of the valve element 24. The hardness of the valve seat forming member 16 is sufficiently high. Thus, the valve seat 22 is hardly deformed by repeated seating of the valve element 24 on the valve seat 22, thereby ensuring the durability of the valve section.

A retaining ring 36 (E-ring) is fitted to a lower part of the actuating rod 34, and a discoidal spring support 38 is provided such that the movement of the lower part of thereof in a downward direction is restricted. A spring 40, which biases the actuating rod 34 downward (in a valve closing direction) (functioning as a "first biasing member"), is set between the spring support 38 and the partition wall 26. The spring 40 is a tapered spring where the diameter thereof is reduced starting from the lower surface of the partition wall 26 toward the spring support 38 located therebelow. Having the guide portion 30 formed in a tapered shape as described above allows the tapered-shape spring 40 to be arranged as described above. A lower part of the body 5 is a small-diameter part 42 and constitutes a coupling portion with the solenoid 3.

A strainer 44, which suppresses foreign materials from entering the port 10, is fitted in an upper end opening of the body 5. Since the foreign material, such as metallic powders, may possibly be contained in the refrigerant discharged from the compressor 101, the strainer 44 prevents or suppresses the foreign material from entering the interior of the control valve 1. The strainer 44 has a bottomed cylindrical filter 46 and is configured such that an opening end of the filter 46 is reinforced by a ring-shaped metallic plate 48. The filter 46 is formed using a metal mesh. The strainer 44 is secured such that the metallic plate 48 is press-fitted to the body 5 while the bottom of the strainer 44 faces upward. As shown in FIG. 2, the strainer 44 is mounted inside the body 5, so that any deformation thereof caused by physical contact with an external structure is prevented.

The solenoid 3 includes a cylindrical core 50, a bottomed cylindrical sleeve 52 inserted around the core 50, a plunger 54, which is contained in the sleeve 52 and which is disposed opposite to the core 50 in the direction of axis line, a cylindrical bobbin 56 inserted around the sleeve 52, an electromagnetic coil 58 wound around the bobbin 56, a cylindrical casing 60, which is so provided as to cover the electromagnetic coil 58 from outside, a connecting member 62 of stepped cylindrical shape, which is assembled, between the core 50 and the casing 60, in a position above the bobbin 56, and an end member 64, which is so provided as to seal off a lower end opening of the casing 60.

The sleeve 52, which is formed of a non-magnetic material, houses the plunger 54 in a lower half thereof. A circular collar 66 is embedded in the end member 64. The collar 66 is set, between the sleeve 52 and the casing 60, in a position below the bobbin 56. The casing 60, the connecting member 62 and the collar 66, which are each formed of a magnetic material, form a yoke of the solenoid 3. The valve unit 2 and the solenoid 3 are secured such that the small-diameter part 42 (lower part) of the body 5 is press-fitted to an upper end opening of the connecting member 62. It is to be noted here that, in the present embodiment, the body 5, the valve seat forming member 16, the connecting member 62, the casing 60 and the end member 64 form a body for the whole control valve 1.

An insertion hole 67 is so formed as to run through the core 50 in a center thereof in the direction of axis line. And a shaft 68 is inserted into the insertion hole 67 in such a manner as to penetrate along the insertion hole 67. The shaft 68 is formed coaxially with the actuating rod 34 and supports the actuating rod 34 from below. The diameter of the shaft 68 is larger than that of the actuating rod 34. The plunger 54 is assembled to a lower half of the shaft 68. In the present embodiment, the shaft 68 and the actuating rod 34 constitute a "transmitting rod" that transmits the solenoidal force to the valve element 24.

The plunger 54 is coaxially supported by the shaft 68 in an upper portion of the plunger 54. A retaining ring 70 (E-ring) is fitted to a predetermined position in an intermediate part of the shaft 68 in the direction of axis line, and the retaining ring 70 works to restrict the movement of the plunger 54 in an upward direction. A plurality of communicating grooves 71 formed in parallel with the axis line are provided on a lateral surface of the plunger 54. The plurality of communicating grooves 71 form communicating paths through which the refrigerant is made to pass between the plunger 54 and sleeve 52.

A ring-shaped shaft support member 72 is press-fitted in an upper end of the core 50, and an upper end of the shaft 68 is slidably supported by the shaft support member 72 in the direction of axis line. An outer periphery of the shaft support member 72 is partially notched and thereby a communicating path is formed between the core 50 and the shaft support member 72. Through this communicating path, the suction pressure Ps of the working chamber 28 is led into the interior of the solenoid 3, too.

The diameter of a lower end of the sleeve 52 is slightly reduced, and a ring-shaped shaft support member 76 (functioning as a "supporting member") is press-fitted to a reduced diameter portion 74 of the sleeve 52. The shaft support member 76 slidably supports a lower end part of the shaft 68. In other words, the shaft 68 is two-point supported by both the shaft support member 72 in an upper side thereof and the shaft support member 76 in a lower side thereof, so that the plunger 54 can be stably operated in the direction of axis line. An outer periphery of the shaft support member 76 is partially notched and thereby a communicating path is formed between the sleeve 52 and the shaft support member 76. The suction pressure Ps introduced into the solenoid 3 is filled through a communicating path between the core 50 and the shaft 68, a communicating path between the plunger 54 and the sleeve 52, and a communicating path between the shaft support member 76 and the sleeve 52.

A spring 78 (functioning as a "second spring") that biases the plunger 54 in an upward direction, namely in a valve closing direction, is set between the shaft support member 76 and the plunger 54. In other words, as the spring load, the valve element 24 receives the net force of a force exerted by the spring 40 in a valve opening direction and a force exerted by the spring 78 in a valve closing direction. However, the spring load of the spring 40 is larger than that of the spring 78. Thus, the overall spring load of the springs 40 and 78 works in a valve opening direction. The spring load thereof can be set by adjusting the press-fitting position of the shaft support member 76 in the sleeve 52. The press-fitting position thereof can be fine-adjusted such that a bottom center of the sleeve 52 is deformed in the direction of axis line by using a predetermined tool after the shaft support member 76 has been temporarily press-fitted to the sleeve 52.

A pair of connection terminals 80 connected to the electromagnetic coil 58 extend from the bobbin 56 and are led outside by passing through the end member 64. Note that only one of the pair of connection terminals 80 is shown in FIG. 2 for convenience of explanation. The end member 64 is mounted in such a manner as to seal the entire structure inside the solenoid 3 contained in the casing 60 from below. The ends of the connection terminals 80 are led out from the end member 64 and connected to a not-shown external power supply. The end member 64 also functions as a connector portion through which the connection terminal 80 is exposed.

The control valve 1 configured as above is secured into a not-shown mounting hole formed in the compressor 101 via a washer. A plurality of O-rings, which are set between the mounting holes and the control valve 1 and which achieve the sealing capability, are fitted on an outer peripheral surface of the control valve 1. Annular grooves are formed on peripheries of the body 5 above and below the port 12, respectively, and O-rings 82 and 84 are fitted on the annular grooves. An annular groove is also formed on a periphery of the connecting member 62 below the port 14, and an O-ring 86 is fitted on the annular groove. Furthermore, an O-ring 88 is fitted on a connection area where the casing 60 and the end member 64 are connected.

Figure 3:
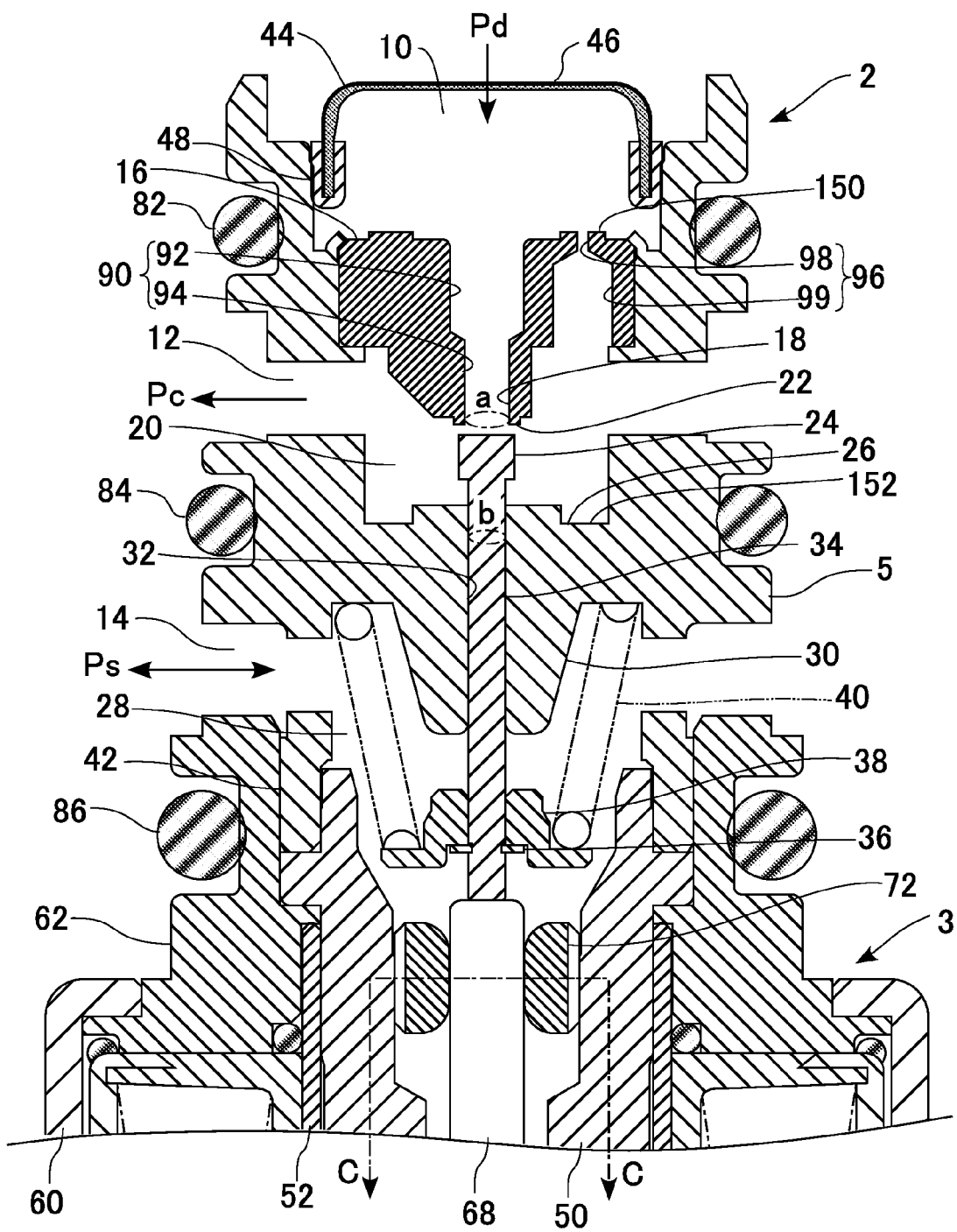
FIG. 3 is a partially enlarged cross-sectional view of the upper half of FIG. 2.

FIG. 3 is a partially enlarged cross-sectional view of the upper half of FIG. 2. The diameter of a through-hole 90, which is formed in a center of the valve seat forming member 16, is reduced in a lower half thereof. This reduced diameter portion of the through-hole 90 forms the valve hole 18. In other words, the upper half of the through-hole 90 is a large-diameter part 92, whereas the lower half thereof is a small-diameter part 94. And the small-diameter part 94 forms the valve hole 18. A connection area of the through-hole 90 in between the large-diameter part 92 and the small-diameter part 94 is a tapered surface where the inside diameter thereof is gradually reduced downward. The diameter of the through-hole 90 is reduced in stages from an upstream side to a downstream side.

A bleed hole 96 in parallel with the through-hole 90 is formed in radially outward direction of the through-hole 90 in the valve seat forming member 16. The bleed hole 96 is used to ensure the circulation of oil in the compressor 101 by delivering a minimum required refrigerant to the crankcase 116 even when the valve section is closed. The refrigerant contains a lubricating oil in order to ensure a stabilized operation of the compressor 101, and the bleed hole 96 is to ensure the oil circulation inside and outside the crankcase 116.

The bleed hole 96 is formed such that a leak passage 98 located in an upper part thereof and a communication passage 99 located in a lower part thereof are connected together. The inside diameter of the leak passage 98 is of a size to a degree that the refrigerant is made to leak therethrough, and the inside diameter thereof is fairly smaller than that of the valve hole 18. The inside diameter of the communication passage 99 is smaller than that of the large-diameter part 92 of the through-hole 90 and larger than that of the small-diameter part 94 thereof. In a modification, the inside diameter of the communication passage 99 may be greater than or equal to that of the large-diameter part 92 of the through-hole 90 or may be less than or equal to that of the small-diameter part 94 thereof.

A connection area of the leak passage 98 and the communication passage 99 is a tapered surface where the inside diameter thereof is gradually enlarged downward. The diameter of the bleed hole 96 is enlarged in stages from an upstream side to a downstream side. An annular raised portion 150 is formed on a top surface of the valve seat forming member 16 in such a manner as to surround the through-hole 90, and the raised portion 150 is of a stepped shape such that a radially inward portion and a radially outward portion of the valve seat forming member 16 are lower than the raised portion 150. The width of the raised portion 150 is sufficiently small and is less than or equal to that of the valve hole 18 in the present embodiment. The leak passage 98 is opened upward in a position of the raised portion 150. In other embodiments the width of the raised portion 150 is smaller than the diameter of the large diameter part 92 of the through hole 90 shown in FIG. 3.

As described above, the bleed hole 96 is formed such that an inlet of refrigerant has a small diameter and the inlet thereof is opened on the top surface of a stepped shape. Thus, the entry of foreign material through the bleed hole 96 is prevented or suppressed. In other words, if a foreign material, whose size is smaller than the mesh width of the strainer 44, enters the port 10, it is highly improbable that the foreign material will enter through the bleed hole 96. This is because the width of the raised portion 150 is sufficiently small and the size of inlet of the bleed hole 96 is smaller. If the foreign material hits the raised portion 150, it is highly probable that the foreign material is dropped to a lower position inside or outside the raised portion 150. In particular, even though the refrigerant flows through the bleed hole 96 when the valve section is closed, the foreign material contained in the refrigerant is unlikely to be led into the bleed hole 96. If the foreign material enters the port 10 when the valve section is opened, most of such foreign material will pass through the valve hole 18 and be discharged from the port 12.

Also, in the valve chamber 20, the guide portion 30 protrudes in a central part of the upper surface of the partition wall 26 and thereby an annular groove 152 is formed on the periphery of this protrusion (the guide portion 30). The outside diameter of the valve element 24 is slightly larger than that of the actuating rod 34 located immediately beneath the valve element 24. Thus, if the foreign material enters the valve chamber 20 through the valve hole 18, it is highly improbable that the foreign material will enter a sliding portion of the actuating rod 34 relative to the guiding passage 32. In the event that the foreign material passes through the valve hole 18, most of such the foreign material will be discharged through the port 12 or stay on in the annular groove 152 even though it should remain in the valve chamber 20. Thus, the remaining foreign material is less likely to enter a spacing or gap between the actuating rod 34 and the guiding passage 32. In other words, the annular groove 152 can function to trap the foreign material therein. Hence, this structure realized by the annular groove 152 prevents the valve element 24 from being locked as a result of the entanglement of foreign material in the sliding portion of the actuating rod 34 relative to the guiding passage 32.

In the present embodiment, the pressure sensitivity of the valve element 24 is optimally set such that an effective pressure-receiving diameter a (the inside diameter of the valve hole 18) in the valve section of the valve element 24 is slightly (e.g., by a very small amount) larger than a diameter b of the sliding portion of the actuating rod 34 (a>b). In other words, such the setting as this increases the extent of contribution of the crank pressure Pc in a valve closing direction at the time the valve section is opened, thereby making it slightly difficult for the valve section to be opened. Thereby, the differential pressure (Pd−Ps) slowly rises and the effect of the crank pressure Pc is raised as compared with the case where a=b. As a result, the actuation responsiveness of the wobble plate (cam plate) of the compressor 101 is lowered so as to prevent or suppress the control hunting occurring when the valve section is opened. It is to be noted here that, for example, the technique disclosed in Japanese Patent Application Publication No. 2006-57506 can be used to adjust the pressure sensitivity.

In the present embodiment, as described earlier, the guide portion 30 protrudes as a larger protrusion on a working chamber 28 side than a valve chamber 20 side. Thereby, a lower end of the actuating rod 34 can protrude from a lower end position of the body 5 (i.e., a lower end opening of the small-diameter part 42). This enables the retaining ring 36 to be easily mounted to the actuating rod 34. In other words, in order for the retaining ring 36 to be fitted to the actuating rod 34, the actuating rod 34 must first be inserted from the valve chamber 20 side. This is because the outside diameter of the valve element 24 is larger than the size of the guiding passage 32. On the other hand, in order for the retaining ring 36 to be fitted to the actuating rod 34, a fitting part formed in the actuating rod 34 needs to be exposed from an opening end of the body 5 or at least the fitting part needs to be positioned near the opening end thereof in consideration of the workability. For this reason, if the guide portion 30 extends (protrudes) uniformly both above and below the partition wall 26, the actuating rod 34 needs to be unnecessarily made longer, which is not preferable at all. In the light of this, in the present embodiment, the guide portion 30 is configured such that the guide portion 30 is positioned in a lower part of the body 5. This configuration and arrangement ensure a more stabilized guiding function of the guide portion 30 and maintain an excellent workability when the retaining ring 36 is to be mounted. Since the actuating rod 34 will not be unnecessarily long, the body 5 and eventually the control valve 1 are made smaller-sized.

Furthermore, in the present embodiment as described above, the guide portion 30 and the spring 40 are each taper-shaped such that the outside diameter thereof becomes gradually smaller downward. Thus, a lower half of the spring 40 is contained in an upper end opening of the core 50, and the outside diameter of the small-diameter part 42 is made as small as possible. Thereby, the outside diameter of the connecting member 62 is made smaller, and an O-ring whose outside diameter is smaller can be selected as the O-ring 86. As a result, when the control valve 1 is to be mounted through the mounting holes of the compressor 101, the effect of the refrigerant pressure acting in a direction opposite to a mounting direction is reduced. That is, an area below the O-ring 86 has an atmospheric air pressure; if the size of the O-ring 86 is large, a fixing structure having a high pressure withstanding property needs be implemented in order to prevent the control valve 1 from fall off. In this regard, the O-ring 86 can be made small in the present embodiment and therefore it suffices that the control valve 1 has a simple fixing structure such as a washer.

Figure 4A:
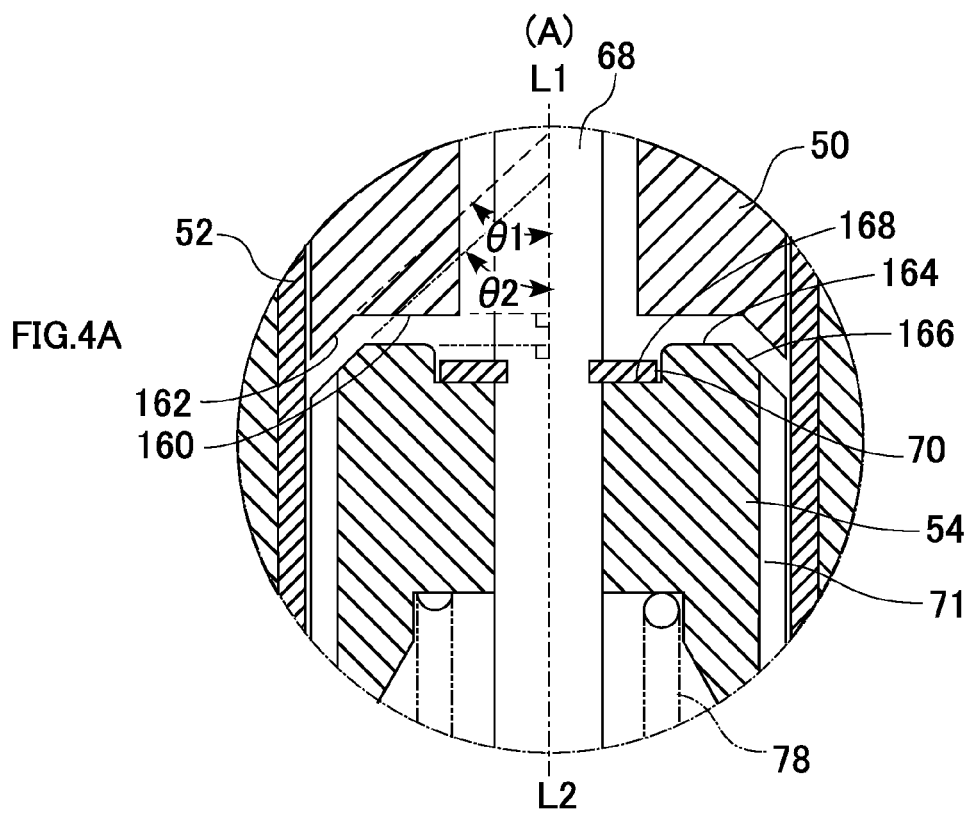
FIG. 4A and FIG. 4B are each a partially enlarged view of a control valve.
Figure 4B:
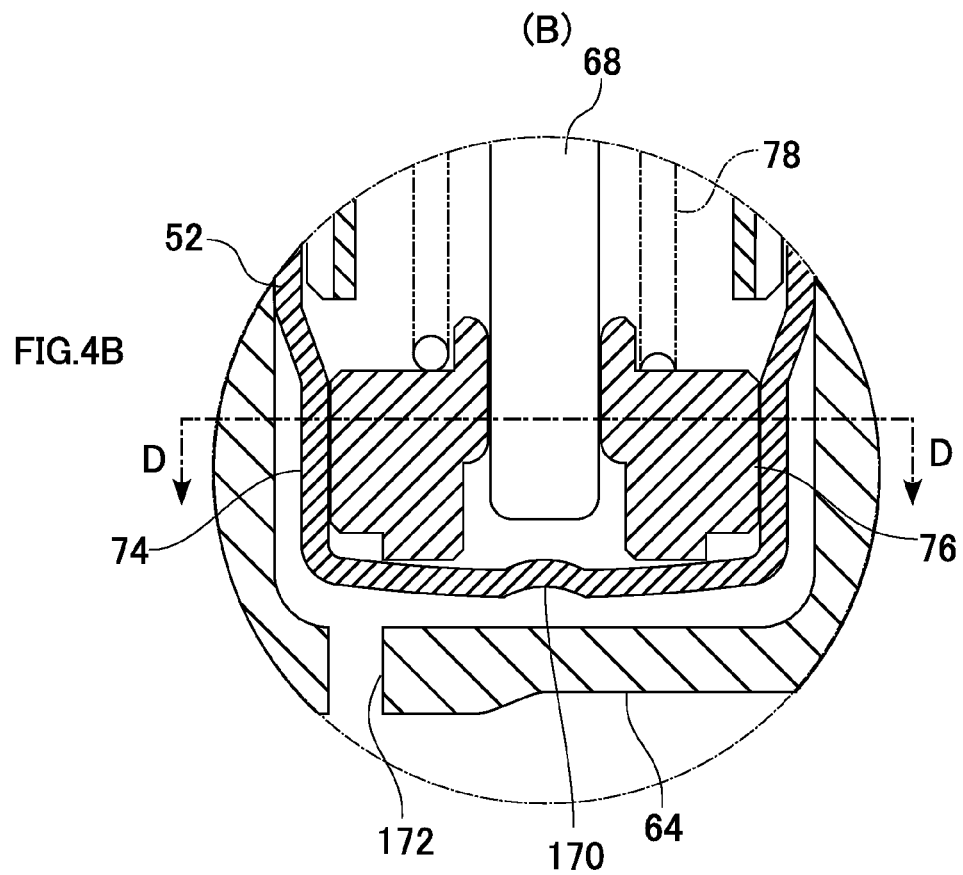
Figure 5A:
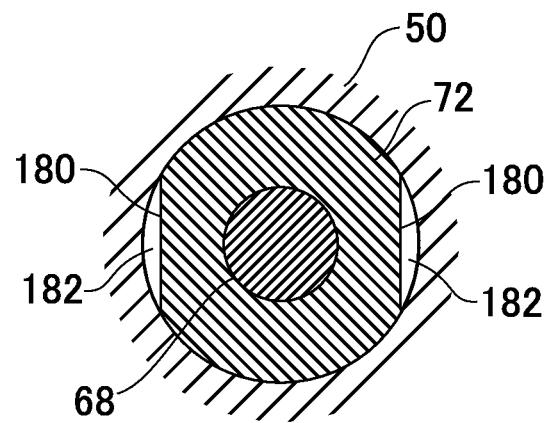
FIG. 5A and FIG. 5B are each a partially enlarged view of a control valve.
Figure 5B:
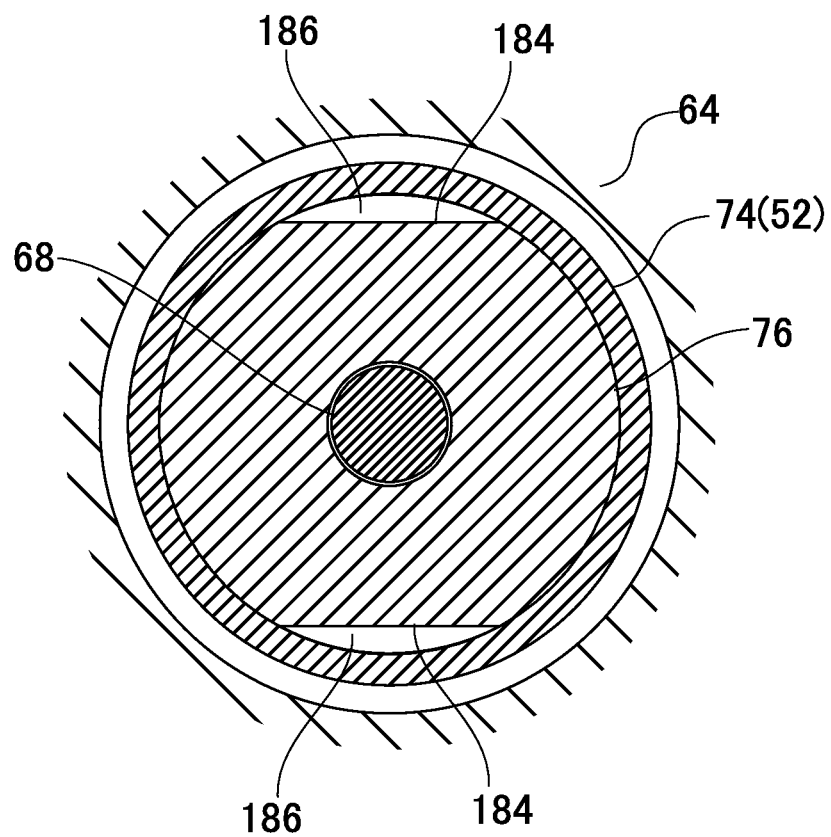

FIGS. 4A and 4B and FIGS. 5A and 5B are each a partially enlarged view of the control valve 1. FIG. 4A is an enlarged view of a region A encircled in FIG. 2, and FIG. 4B is an enlarged view of a region B encircled in FIG. 2. FIG. 5A is a cross-sectional view taken along the line C-C and viewed on the arrows of FIG. 3. FIG. 5B is a cross-sectional view taken along the line D-D and viewed on the arrows of FIG. 4B.

As illustrated in FIG. 4A, a surface of the core 50 is disposed counter to a surface of the plunger 54 and vice versa, and these facing surfaces of the core 50 and the plunger 54 are generally complementary in shape to each other. Also, the outer circumferential edge of each facing surface thereof is formed in a tapered shape. In other words, a lower end surface of the core 50 has a flat surface 160 in a central part thereof and a tapered surface 162 in an outer circumferential edge thereof. The flat surface 160 is perpendicular to an axis line L1 of the core 50, the inside diameter of the tapered surface 162 is larger downward, and the tapered surface 162 forms an angle of θ1 relative to the axis line L1. On the other hand, an upper end surface of the plunger 54 has a flat surface 164 in a central part thereof and a tapered surface 166 in an outer circumferential edge thereof. The flat surface 164 is perpendicular to an axis line L2 of the plunger 54, the diameter of the tapered surface 166 is larger downward, and the tapered surface 166 forms an angle of θ2 relative to the axis line L2. In the present embodiment, θ1=θ2=45 degrees. The setting of the tapered surfaces adjusts the characteristics of the solenoid 3, and its detail will be discussed later.

A recess 168 having a predetermined depth is formed in a center of the flat surface 164 of the plunger 54, and a retaining ring 70 is received by the recess 168. In other words, the interference between the retaining ring 70 and the core 50 is prevented.

As illustrated in FIG. 4B, a recess-like pressing force adjustment part 170 is formed in a center of an underside of the reduced diameter portion 74 in the sleeve 52. A tip of a tool is placed in position and then pressed on the pressing force adjustment part 170. Thereby, a bottom face of the sleeve 52 is deformed in an upward direction of axis line (an inward direction of the sleeve 52) and the press-fitting position of the shaft support member 76 is shifted while the bottom face thereof being deformed. This can fine-adjust the set load by the springs 40 and 78.

In this manner, the shaft support member 76 is press-fitted to the sleeve 52, so that it can be maintained without varying the set load thereof in the event that the bottom face of the sleeve 52 is deformed after the set load thereof has been adjusted. In other words, in the present embodiment, as described above, carbon dioxide, which operates in a high pressure, is used as the refrigerant and therefore even the suction pressure Ps is high. Thus, there is a possibility that the bottom portion of the sleeve 52 deformed by the pressing force adjustment part 170 will be deformed in a direction where the bottom portion thereof returns to the original position by the suction pressure Ps. Should this happen, the shaft support member 76 will not be affected by the deformation of the bottom portion thereof because the shaft support member 76 has been firmly secured to the inner wall of the sleeve 52. In other words, by employing the present embodiment, the configuration is such that the press-fitting position of the shaft support member 76 is regulated, so that the set load of the springs can be stably maintained even in a high-pressure environment.

As illustrated in FIG. 4B, a space is formed between the end member 64 and the sleeve 52. A communicating hole 172, which communicates between the space and the exterior, is formed in a bottom portion of the end member 64. The communicating hole 172 is an air hole through which to release air in the space to the exterior when the sleeve 52 and the end member 64 are assembled together, and functions as a passage through which a pressure occurring in the space is to be released when they are to be assembled.

As illustrated in FIG. 5A, the shaft support member 72 is formed such that a so-called D-cut process is performed on the outer periphery of a disk-shaped body thereof. And a pair of flat surfaces 180 are formed. A communicating path 182 is formed between the flat surface 180 and an inner circumferential surface of the core 50. As illustrated in FIG. 5B, the shaft support member 76 is formed such that the so-called D-cut process is performed as well on the outer periphery of a disk-shaped body thereof. And a pair of flat surfaces 184 are formed. A communicating path 186 is formed between the flat surface 184 and the sleeve 52. The suction pressure Ps of the working chamber 28 passes through the communicating paths 182 and 186 and is then filled within the sleeve 52.

In the above-described configuration, the diameter of the actuating rod 34 is slightly smaller than the inside diameter of the valve hole 18 but is of a size approximately identical thereto. Thus, the effect of the crank pressure Pc operating on the valve element 24 in the valve chamber 20 is almost canceled out. As a result, the differential pressure (Pd−Ps) practically operates on the valve element 24 for a pressure-receiving area having the approximately same size as that of the valve hole 18. The valve element 24 operates and moves such that the differential pressure (Pd−Ps) is kept at a preset differential pressure set by a control current supplied to the solenoid 3.

A basic operation of the control valve for the variable displacement compressor is now explained.

In the control valve 1, when the solenoid 3 is turned off, the valve element 24 gets separated away from the valve seat 22 by the net force of the springs 40 and 78 in a valve opening direction with the result that the valve section is remained at a fully opened state. At this time, a high-pressure refrigerant having the discharge pressure Pd introduced into the port 10 from the discharge chamber 114 of the compressor 101 passes through the fully-opened valve section and then flows into the crankcase 116 through the port 12. As a result, the crank pressure Pc is raised and the compressor 101 carries out a minimum capacity operation where the discharging capacity is the minimum.

When, on the other hand, at the startup of the automotive air conditioner or when the cooling load is the maximum, the value of current supplied to the solenoid 3 is the maximum and the plunger 54 is attracted by a maximum suction force of the core 50. At this time, the actuating rod 34 (including the valve element 24), the shaft 68 and the plunger 54 operate and move integrally altogether in a valve closing direction, and the valve element 24 is seated on the valve seat 22. The crank pressure Pc drops by this valve closing movement and therefore the compressor 101 carries out a maximum capacity operation where the discharging capacity is the maximum.

When the value of current supplied to the solenoid 3 is set to a predetermined value while the capacity is being controlled, the actuating rod 34 (including the valve element 24), the shaft 68 and the plunger 54 operate and move integrally altogether. At this time, the valve element 24 stops at a valve-lift position. This valve-lift position is a position where five loads/forces are all balanced thereamong. Here, the five loads/forces are the spring load of the spring 40 that biases the actuating rod 34 in a valve opening direction, the spring load of the spring 78 that biases the plunger 54 in a valve opening direction, the load of the solenoid 3 that biases the plunger 54 in a valve closing direction, the force by the discharge pressured Pd that the valve element 24 receives in a valve opening direction, and the force by the suction pressure Ps that the valve element 24 receives in a valve closing direction.

If, in this balanced state, the rotating speed of the compressor 101 rises simultaneously with an increased engine speed and thereby the discharging capacity increases, the differential pressure (Pd−Ps) will increase and then the force in a valve opening direction will exert on the valve element 24. As a result, the valve element 24 further uplifts its position and thereby the flow rate of refrigerant flowing from the discharge chamber 114 to the crankcase 116 increases. This, in turn, causes the crank pressure Pc to rise and then the compressor 101 operates in a direction such that the discharging capacity is reduced. Then the compressor 101 is controlled such that the differential pressure (Pd−Ps) becomes the preset differential pressure. If the engine speed drops, the compressor 101 operates in a manner reverse to the aforementioned operation and then the compressor 101 is controlled such that the differential pressure (Pd−Ps) becomes the preset differential pressure.

Figure 6:
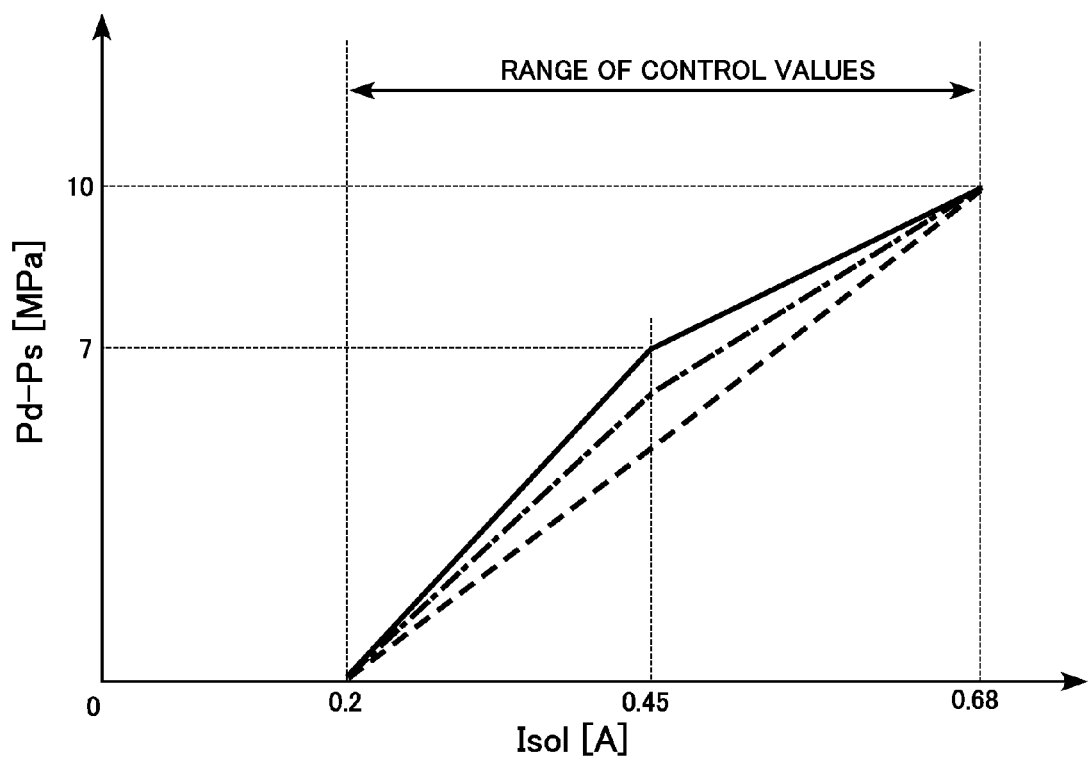
FIG. 6 is a graph showing a control characteristic of a solenoid.

FIG. 6 is a graph showing control characteristic of the solenoid 3. The horizontal axis of FIG. 6 indicates a value of current supplied to the solenoid 3 (Isol (A)), and the vertical axis thereof indicates a preset differential pressure (Pd−Ps) (Mpa) as the control target value. In the present embodiment, the surface of the core 50, which faces the surface of the plunger 54, and the surface of the plunger 54, which faces the surface of the core 50, are formed in the tapered shapes complementary to each other, as described above. As a result, the resolution power in a high current domain is improved in a range of the control current values (hereinafter referred to as a "control current value range" also).

In other words, as described above, the angles of the tapered surfaces at a core 50 side and a plunger 54 side are each set to 45 degrees ($\theta1=\theta2=45$ degrees in FIG. 4A). Thereby, as indicated by a solid line in FIG. 6, the characteristic after an intermediate value in the control current value range is varied. In other words, as the control characteristic of the solenoid 3, the slope (rate of change or amount of change) of a preset differential pressure (Pd−Ps) relative to the value of current supplied thereto (Isol) is set smaller in a high current domain after the intermediate value than the slope of a low current value before the intermediate value. More specifically, the control current value range is the range of 0.2 A to 0.68 A, and the control characteristic is varied before and after an intermediate value between 0.2 A and 0.68 A, which is 0.45 A, as a boundary value. Thereby, the resolution power in the high current domain improves. This means that when the preset differential pressure (Pd−Ps) is increased, a finer adjustment of the preset differential pressure can be made. In other words, the amount of change in the electromagnetic force of the solenoid 3 can be made smaller in the high current domain than in the other domain. In the present embodiments, carbon dioxide, which operates under a high pressure, is used as the refrigerant. Thus, it is extremely convenient and advantageous that the accuracy of control can be enhanced in a range where the differential pressure is large.

A dashed line in FIG. 6 shows a case where the angle of the tapered surface is set to 30 degrees ($\theta1=\theta2=30$ degrees), and a broken line shows a case where the angle of the tapered surface is set to 20 degrees ($\theta1=\theta2=20$ degrees). As evident from FIG. 6, the variation in the characteristic before and after the intermediate value (the boundary value) can be made larger by taking a larger taper angle. Conversely, the variation in the characteristic before and after the intermediate value can be made smaller by taking a smaller taper angle. Hence, the optimum control characteristic can be achieved by varying the taper angle in accordance with the specifications.

The description of the present invention given above is based upon illustrative embodiments. These embodiments are intended to be illustrative only and it will be obvious to those skilled in the art that various modifications could be further developed within the technical idea underlying the present invention.

In the above-described embodiments, an example is shown where a press-fitting adjustment structure for adjusting the press-fitting of the shaft support member 76 to the sleeve 52 is applied to a so-called (Pd−Ps) differential pressure regulating valve. In a modification, the press-fitting adjustment structure may be applied to a so-called (Pc−Ps) differential pressure regulating valve, for instance. In the (Pc−Ps) differential pressure regulating valve, a differential pressure (Pc−Ps) between the crank pressure Pc and the suction pressure Ps is brought closer to a preset differential pressure, which is a control target value. In other words, the above-described press-fitting adjustment structure may be applied to a control valve that varies a discharging capacity of the compressor for compressing refrigerant led into the suction chamber and discharges the compressed refrigerant from the discharge chamber, by regulating the flow rate of refrigerant led out to the suction chamber from the crankcase. Or alternatively, the press-fitting adjustment structure may be applied to a so-called Ps control valve in which the suction pressure Ps is brought closer to a preset pressure, which is a control target value. In particular, when those control valves are to be applied to the supercritical refrigeration cycle that uses a refrigerant such as carbon dioxide, the functions of the above-described press-fitting adjustment structure are effectively achieved.

In the above-described embodiments, an example is shown where the shaft support member 76 not only functions as a spring support for supporting the spring 78 but also functions as a shaft support member for supporting the shaft 68. In a modification, a spring support for supporting the spring 78 and a shaft support member for supporting the shaft 68 may be provided separately; and the above-described press-fitting adjustment structure may be applied to this spring support.

In the above-described embodiments, an example is shown where the control valve having the above-described press-fitting adjustment structure is applied to the supercritical refrigeration cycle that uses carbon dioxide as the refrigerant. In a modification, a similar control valve may be applied to a supercritical refrigeration cycle that uses a substance other than carbon dioxide as the refrigerant. Or alternatively, a similar control valve may be applied to a refrigeration cycle that does not operate in a supercritical range but to the refrigeration cycle where the pressure of refrigerant gets high.

In the above-described embodiments, an exemplary structure is shown where the actuating rod 34 and the shaft 68 are manufactured as separate units and then they are coupled together such that one of them is abutted against the other thereof coaxially in the direction of axis line, thereby constituting the thus coupled one as a transmitting rod for transmitting the solenoidal force to the valve element 24. In a modification, the actuating rod 34 and the shaft 68 may be integrally formed as a single element.

In the above-described embodiments, a structure is shown where, in valve seat forming member 16, the inlet of refrigerant in the bleed hole 96 has a small diameter and the inlet thereof is opened on the top surface of the stepped shape (see FIG. 3). This structure markedly achieves the function of suppressing the entry of foreign material in the refrigeration cycle where the refrigerant pressure gets high as in the above-described embodiments. In other words, the higher the discharge pressure Pd is, the more it is likely that the foreign material enters the port 10 by passing through the strainer 44. In spite of this problem, this function of suppressing the entry of foreign material reduces at least the possibility that the foreign material will reach up to the valve chamber 20 through the bleed hole 96. This eventually leads to maintaining the excellent control characteristic of the control valve 1 in a high pressure environment.

In the above-described embodiments, an example is shown where the raised portion 150 is formed annularly on the top surface of the valve seat forming member 16. It goes without saying that a shape other than this may be employed. For example, the raised portion may be formed only around the inlet of refrigerant of the bleed hole 96. Although, in the above described-embodiments, an example is shown where only a single bleed hole 96 is formed, a plurality of bleed holes 96 may be formed in a plurality of positions. In such a case, too, the inlet of refrigerant of each bleed hole 96 may preferably be provided on the top surface of the raised portion (stepped shape).

In the above-described embodiments, an example is shown where the annular groove 152 is formed such that an inward peripheral edge of the partition wall 26 is lowered in height by one step (see FIG. 3). This structure, too, markedly achieves the function of trapping the foreign material in the refrigeration cycle where the refrigerant pressure gets high as in the above-described embodiments. In other words, the higher the discharge pressure Pd is, the more it is likely that the foreign material enters the port 10 and eventually enters the valve chamber 20 by passing through the strainer 44. In spite of this problem, this function of trapping the foreign material reduces at least the possibility that the foreign material will reach up to the gap between the actuating rod 34 and the guiding passage 32. This eventually leads to maintaining the excellent control characteristic of the control valve 1 in a high pressure environment.

In the above-described embodiments, an example is shown where a single annular groove is formed as a structure for trapping the foreign material. Other structures than this may be employed, instead. For example, a plurality of annular grooves may be concentrically formed. Or alternatively, a small region on a center of the top surface of the guide portion 30 may have a raised portion and the guiding passage 32 may be opened on the top surface of this raised portion. For example, the diameter of this raised portion may be less than or equal to ⅓ of the inside diameter of the valve chamber 20, and so forth; in this manner, this raised portion may be sufficiently small-sized. The diameter of this raised portion may be approximately equal to that of the valve element 24. In other words, this configuration may be such that an upper-end position of the guide portion 30 is higher than its surrounding area, rather than the configuration where the groove is formed in the inward peripheral edge of the partition wall 26.

Though not mentioned in the above-described embodiments, the communicating hole 172 shown in FIG. 4B may be positioned directly beneath the pressing force adjustment part 170, instead. In this modification, the communicating hole 172 may also function as an insertion hole for tools.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modification. Also, one or some of all of the components exemplified in the above-described embodiments and modifications may be left unused or removed.

What is claimed is:

1. A control valve for a variable displacement compressor for varying a discharging capacity of the compressor for compressing refrigerant led into a suction chamber and discharging the compressed refrigerant from a discharge chamber, by regulating a flow rate of the refrigerant led into a crankcase from the discharge chamber, the control valve comprising:

a body having a discharge chamber communication port communicating with the discharge chamber, a crankcase communication port communicating with the crankcase, a valve hole formed in a passage connecting the discharge chamber communication port and the crankcase communication port, and a valve chamber formed between the valve hole and the crankcase communication port;

a valve element for opening and closing a valve section by moving toward and away from the valve hole, the valve element being arranged in the valve chamber;

a solenoid, provided on the body, which generates a solenoidal force with which to drive the valve element in a valve closing direction in accordance with an amount of current supplied thereto; and a bleed hole that enables the refrigerant to be leaked from the discharge chamber communication port to the valve chamber while the valve section is being closed, the bleed hole having a leak passage, whose diameter is smaller than that of the valve hole, and the bleed hole being provided radially outward of the valve hole in the body, wherein the valve hole constitutes part of a through-hole extending in a direction of axis line through a member for separating the discharge chamber communication port from the valve chamber inside the body, wherein the through-hole and the bleed hole are formed through the member in such a manner that each of the through-hole and the bleed hole allows the discharge chamber communication port and the valve chamber to communicate with each other, wherein the member has a flat surface with an opening at which the through-hole is open toward the discharge chamber communication port, and a raised portion protruding from the flat surface toward the discharge chamber communication port, wherein the through-hole has a large-diameter part being open on the discharge chamber communication port side, and a small-diameter part, the small diameter part defining the passage that forms the valve hole and being open on a valve chamber side and having a diameter smaller than a diameter of the large-diameter part, wherein the raised portion has a width smaller than the diameter of the large-diameter part, and wherein the leak passage is open on the discharge chamber communication port side at a top surface of the raised portion.

2. The control valve, for a variable displacement compressor, according to claim 1, wherein control is performed such that a differential pressure between a discharge pressure of the discharge chamber and a suction pressure of the suction chamber is maintained at a preset differential pressure according to a value of current supplied to the solenoid.

3. The control valve, for a variable displacement compressor, according to claim 1, wherein the control valve is applied to a refrigeration cycle in which a refrigeration operation is performed in a supercritical range exceeding a critical temperature of the refrigerant.

4. The control valve, for a variable displacement compressor, according to claim 3, wherein control is performed such that a differential pressure between a discharge pressure of the discharge chamber and a suction pressure of the suction chamber is maintained at a preset differential pressure according to a value of current supplied to the solenoid.

5. The control valve, for a variable displacement compressor, according to claim 1, wherein the body includes a suction chamber communication port communicating with the suction chamber, a working chamber, which allows the suction chamber communication port and an interior of the solenoid to communicate with each other, a partition wall, which divides an internal space of the body into the valve chamber and the working chamber, and a guiding passage formed in the partition wall, the control valve further comprising an actuating rod that transmits the solenoidal force to the valve element, wherein the actuating rod is slidably supported by the guiding passage, and one end of the actuating rod is coupled to the valve element in the valve chamber and the other end thereof is coupled to the solenoid, wherein a guide portion, which so protrudes as to form a step, is provided on an end surface of the partition wall at a valve chamber side, and wherein the guiding passage is open on the valve chamber side in the guide portion.

6. The control valve, for a variable displacement compressor, according to claim 5, wherein control is performed such that a differential pressure between a discharge pressure of the discharge chamber and a suction pressure of the suction chamber is maintained at a preset differential pressure according to a value of current supplied to the solenoid.

7. The control valve, for a variable displacement compressor, according to claim 5, wherein the control valve is applied to a refrigeration cycle in which a refrigeration operation is performed in a supercritical range exceeding a critical temperature of the refrigerant.

8. The control valve, for a variable displacement compressor, according to claim 7, wherein control is performed such that a differential pressure between a discharge pressure of the discharge chamber and a suction pressure of the suction chamber is maintained at a preset differential pressure according to a value of current supplied to the solenoid.

9. The control valve, for a variable displacement compressor, according to claim 1, wherein the bleed hole is formed such that the leak passage and a communication passage, whose diameter is larger than that of the leak passage, are connected in the direction of axis line, and wherein the communication passage is open on the valve chamber side.

10. The control valve, for a variable displacement compressor, according to claim 9, wherein control is performed such that a differential pressure between a discharge pressure of the discharge chamber and a suction pressure of the suction chamber is maintained at a preset differential pressure according to a value of current supplied to the solenoid.

11. The control valve, for a variable displacement compressor, according to claim 9, wherein the control valve is applied to a refrigeration cycle in which a refrigeration operation is performed in a supercritical range exceeding a critical temperature of the refrigerant.

12. The control valve, for a variable displacement compressor, according to claim 11, wherein control is performed such that a differential pressure between a discharge pressure of the discharge chamber and a suction pressure of the suction chamber is maintained at a preset differential pressure according to a value of current supplied to the solenoid.

13. The control valve, for a variable displacement compressor, according to claim 9, wherein the body includes a suction chamber communication port communicating with the suction chamber, a working chamber, which allows the suction chamber communication port and an interior of the solenoid to communicate with each other, a partition wall, which divides an internal space of the body into the valve chamber and the working chamber, and a guiding passage formed in the partition wall, the control valve further comprising an actuating rod that transmits the solenoidal force to the valve element, wherein the actuating rod is slidably supported by the guiding passage, and one end of the actuating rod is coupled to the valve element in the valve chamber and the other end thereof is coupled to the solenoid, wherein a guide portion, which so protrudes as to form a step, is provided on an end surface of the partition wall at a valve chamber side, and wherein the guiding passage is open on the valve chamber side in the guide portion.

14. The control valve, for a variable displacement compressor, according to claim 13, wherein control is performed such that a differential pressure between a discharge pressure of the discharge chamber and a suction pressure of the suction chamber is maintained at a preset differential pressure according to a value of current supplied to the solenoid.

15. The control valve, for a variable displacement compressor, according to claim 13, wherein the control valve is applied to a refrigeration cycle in which a refrigeration operation is performed in a supercritical range exceeding a critical temperature of the refrigerant.

16. The control valve, for a variable displacement compressor, according to claim 15, wherein control is performed such that a differential pressure between a discharge pressure of the discharge chamber and a suction pressure of the suction chamber is maintained at a preset differential pressure according to a value of current supplied to the solenoid.

* * * * *